Feb. 11, 1941.　　　J. U. LEHN　　　2,231,390
ANIMAL TRAP
Filed July 29, 1938　　　2 Sheets-Sheet 2
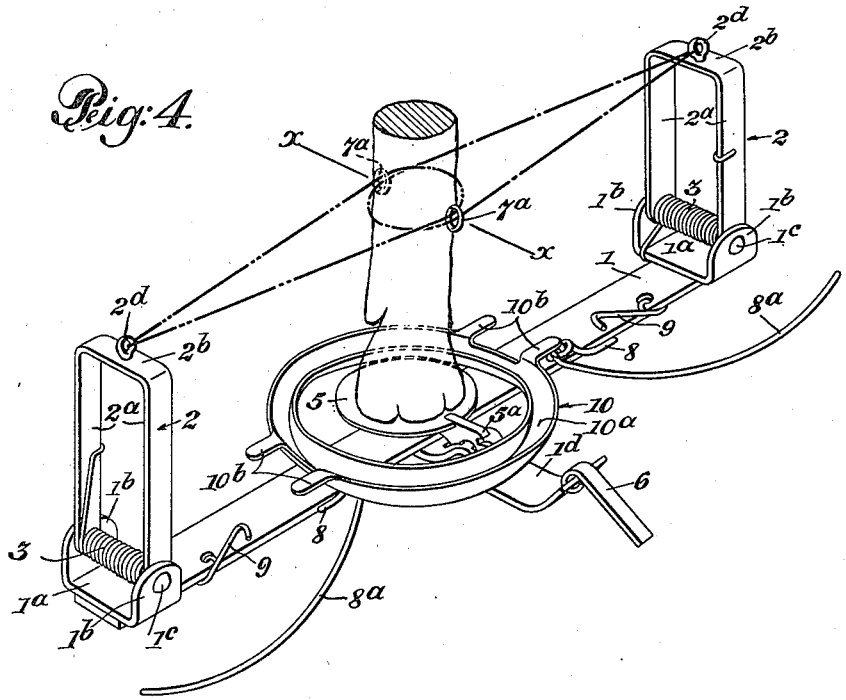
Fig. 4.
Fig. 5.
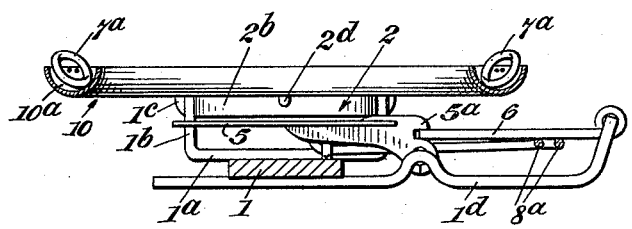
INVENTOR
John U. Lehn
BY
Louis Prevost Whitaker
ATTORNEY Patented Feb. 11, 1941

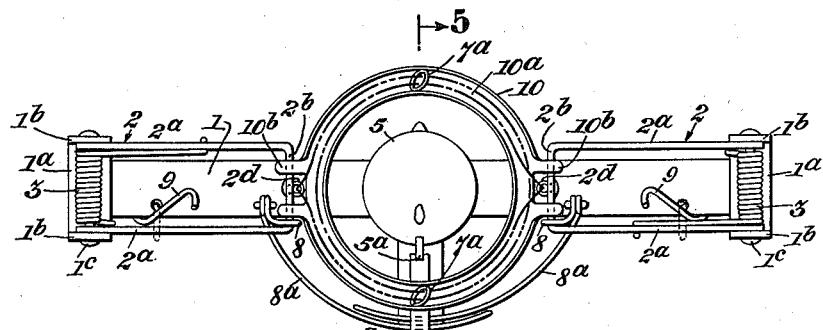
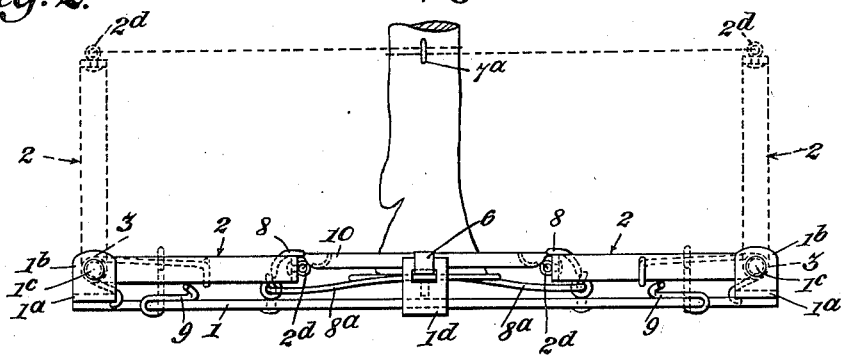
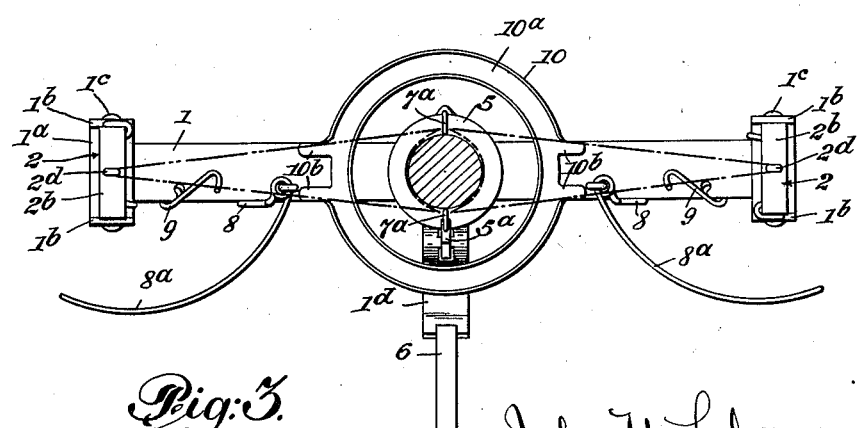

2,231,390

UNITED STATES PATENT OFFICE 2,231,390

ANIMAL TRAP

John U. Lehn, Lititz, Pa., assignor to Animal Trap Company of America, Lititz, Pa., a corporation of Pennsylvania Application July 29, 1938, Serial No. 221,878

9 Claims. (Cl. 43—87)

My invention consists in the novel features hereinafter described, reference being had to the accompanying drawings which illustrate one embodiment of my invention, selected by me for purposes of illustration and the said invention is fully disclosed in the following description and claims.

The object of my invention is to provide a snare trap capable of use in an animal burrow or hole, as well as in a runway and in open ground. To use a trap of this character in an animal's burrow or hole, it is necessary to have the trap narrow and the snare tensioning means capable of springing without rising to any very great height. In carrying my invention into effect, I provide a rather long and narrow base plate having at each end spring actuated snare tensioning frames or members supported by pivots extending transversely with respect to the base plate and constructed to swing upwardly and away from each other in moving from the set position of the trap to the sprung position. While the arms are short, they are capable of moving in an arc of 90 degrees or more in drawing the snare taut, and as they move away from each other they provide a long reach between them when sprung. The snare is constructed so that the portions which surround the leg of the animal will be substantially midway between the spring actuated arms, thus giving great flexibility to the snare, as the spring actuated arms may yield under movements of the animal without losing the grip of the snare about the imprisoned leg or providing any purchase by means of which the animal may pull out or twist or "wring off" its foot and escape. I also prefer to form the snare of two flexible members, each of which is doubled to form a loop, the loop of one member overlapping the loop of the other member, and the snare members being connected at opposite sides of the loop by guiding rings. With this form of snare the animal's leg will be completely surrounded by the noose formed by opposed portions of the two loops, and may be securely held without the necessity of using such powerful springs which are ordinarily employed in snare traps. The animal will be held, therefore, with less pressure on the imprisoned leg, which tends to make the trap more humane. This form of snare also enables the animal to make movements of the leg to different inclined positions longitudinally of the trap, and also transversely thereof, without appreciable resistance.

Other features of my improved trap will be specifically described hereafter.

In the accompanying drawings—

Fig. 1 represents a plan view of my improved snare trap in set position.

Fig. 2 is a side elevation of the trap in the position shown in Fig. 1, dotted lines indicating the sprung position.

Fig. 3 is a plan view of the trap in the sprung or released position, showing the snare tightened around the leg of the animal, which is indicated by dotted lines.

Fig. 4 is a perspective view of the trap in the sprung position, the leg of an animal within the snare being indicated in dotted lines.

Fig. 5 is a cross section on line 5—5 of Fig. 1.

In the form of the trap illustrated in the drawings, 1 represents the base plate, which is of considerable length and is provided at each end with a bracket 1a having upturned ends 1b, to which are pivotally connected the oppositely disposed tensioning arms or members 2, 2, each of these tensioning members being preferably formed in U-shape, having the lateral arms 2a connected centrally by a cross bar 2b. The ends of the arms 2a are perforated or provided with suitable apertures to receive a pivot pin 1c extending through the upturned arms of the bracket 1a. Springs 3, 3 encircle the pivot pin 1c and are connected to the brackets 1a and to one of the adjacent arms 2a respectively. The tension of the spring tends to throw the arms from a horizontal or set position, upwardly and outwardly, so that the two arms swing away from each other.

1d represents what is termed a cross or transverse bar secured to the base plate 1 by riveting or spot welding, or otherwise, and carrying at its outer end a dog 6 pivotally mounted at an upturned end portion of the cross in a well known way. 5 represents the usual pan pivotally mounted on the cross and provided with a detent 5a to engage the dog 6. The pan 5 is located substantially midway between the pivotal connections of the arms 2.

Each of the cross bars 2b of the tension arms 2, 2 is provided with a suitable attaching device, preferably in the form of an eye, 2d, to which one of the snare members is permanently connected. The snare consists of two members formed of chain, cord, wire or other suitable flexible material. Each snare member is in the form of a piece of flexible material bent or folded upon itself in the form of a loop, the ends of the members being connected to one or other of the fastening devices, 2d. The two loops thus separately connected to the oppositely disposed tension members, overlap each other to form a noose when the trap is set, as clearly shown in Fig. 1 and in Fig. 3, in which the trap is sprung. The lateral portions of the two snare members are united by rings 7a through which they can freely reeve to permit the enlargement or closing of the snare noose.

Adjacent to the free end of each of the tensioning arms in the set position, the base plate 1 is provided with a detent 8 pivotally connected with the base plate and provided with a long curved setting arm 8a adapted to lie beneath the dog 6 in the set position of the trap, and to hold the tensioning arms 2 in their set position, as clearly shown in Fig. 1. To facilitate the setting of the trap, and prevent its accidental closing, I conveniently provide the base plate adjacent to each end with an auxiliary safety hook 9, which lies upon the base plate when not in use, but which can be raised to a vertical position, as shown in dotted lines in Fig. 2, and hooked over the adjacent sides of one of the tensioning arms, so as to hold it in its depressed or horizontal position while the snare noose is being opened and arranged within a suitable snare guide, hereinafter described.

In order to facilitate the arrangement of the noose of the snare around the pan in setting the trap, I find it convenient, to provide a snare holder, indicated at 10, substantially circular in form and hollowed out to form channel 10a to receive the snare. This device 10 which is free to move bodily upward from and is preferably entirely unconnected with the other parts of the trap is preferably arranged concentrically with respect to the pan and may be conveniently supported in position when the trap is set by providing it at opposite sides with lugs or projections 10b, which may rest upon the cross bars 2b of the tension arms in the set position of the trap. The channel 10a holds the noose against its being accidentally disturbed after the trap is set and before it is sprung, and when the trap is sprung the snare holder together with the snare is thrown upward bodily by the upward movement of the spring actuated arms acting on the lugs or projections 10b, thus offering no retarding action to the movement of said arms, and insuring that the snare noose shall engage the animal's leg at a point well up on the same, and holding the noose of the snare in circular form until the spring actuated arms have taken up the slack and contracted the noose upon the animal's leg. As the snare noose is closed by the spring actuated arms, it will of course be removed from the channel of the snare holder, which falls back upon the main frame in a position surrounding the foot of the animal's imprisoned leg. The action of the snare holder in raising the noose around the animal's leg prevents the snare from catching on the pan or other part of the trap and there is no danger of any part lagging and missing the animal's leg. By the time the upward movement of the snare holder ceases, after it has been disengaged from the spring actuated arms, the snare noose has closed sufficiently to withdraw itself from the channel of the snare holder.

In order to set the trap the operator will fold down the spring actuated tension arms 2 into a horizontal position and temporarily secure them by means of the safety catches 9, 9. This leaves the loops of the snare entirely free, the detents 8, 8, will then be engaged with the cross bars of the respective tension arms 2, and the setting arms 8a thereof will be brought into position so that the dog 6 may be folded over upon them and engage with the tripping pan 5. The snare holder 10 is then placed in position and the noose is arranged with the overlapping loop portions parallel and disposed in the channel 10a of the snare holder in the manner indicated in Fig. 1. The safety catches 9 are then removed and the trap is fully set.

It will be seen that the trap is long and narrow and can readily be placed in an animal's burrow or hole, or in a runway, although it is equally adapted for use on level ground.

The trap is released by the foot of the animal engaging the tripping pan 5 and releasing the dog 6. This releases the setting arm 8a and detents 8, 8, permitting the spring actuated arms 2 to rise, lifting the snare holder and noose as above described, and swing away from each other, each carrying its own noose portion of the snare, and contracting the loop around the leg of the animal at a distance above the pan, substantially equal to the height of the tensioning arms 2. It will be noted particularly with respect to Figs. 3 and 4, that, as the snare is drawn taut, one half of the leg of the animal is closely embraced by the loop portion of one snare member, while the opposite half of the leg is as firmly embraced by the loop portion of the other snare noose member, so that the snare encircles completely the leg of the animal and holds it midway between the spring actuated tension arms 2. The arms 2 are capable of swinging upward and outward 90 degrees or more, and will continue to swing until the snare noose is closed around the animal's leg, the lateral portions of the snare members reeving through the rings 7a, as will be clearly understood from a comparison of Fig. 1 and Fig. 3. The total length of the snare is such that, as shown in the drawings, when it has been tightly drawn about the leg of the animal the tension arms will have moved through substantially ninety degrees, and will be nearly or substantially vertical, so that the snare will not be drawn downwardly with respect to the animal's leg, as it is desirable to have it embrace the leg at as high a point thereon as possible. Obviously the snare is very flexible, as the animal's leg is held between and at considerable distance from the arms 2, 2, which, however, exert continuous pressure in opposite directions on the leg. The leg of the animal can be freely rocked transversely of the base 1, and I conveniently make the eyes or fastening devices 2d with a swivel connection with the cross bars 2b, as indicated in Fig. 1, to facilitate this rocking motion without resistance from the chain or other type of snare members. The connecting rings 7a will naturally position themselves at opposite sides of the leg, as shown in Figs. 2 and 4, and the animal is free to rock his leg longitudinally of the base plate, the noose portion of the snare surrounding his leg rocking with the leg on a horizontal axis, indicated at x—x, and passing through the rings 7a, 7a, so that it is possible to make such rocking motions of the leg without shortening the snare between the points at which it is connected with the snare tensioning means. More flexibility is provided by the fact that the snare is tensioned between two spring actuated arms, so that if the animal's leg moves in a direction towards one of said arms longitudinally of the trap, that arm will move to keep the snare taut and at the same time draw against the other arm, which can likewise yield, all without releasing in any way the grip of the snare noose upon the leg of the animal.

The animal can also move his leg laterally with respect to the trap, as in such case the spring actuated tensioning arms will yield inwardly toward each other to permit such movements without in any way slacking the grip of the snare noose on the animal's leg. It is found in practice that by reason of the fact that the loops of the double loop snare members entirely surround the leg of the animal, it is unnecessary to use such strong springs as would otherwise be necessary in connection with the tension devices 2. Thus, there is less pressure of the surrounding noose portions of the snare on the leg of the animal, and this fact, together with the extreme flexibility and freedom of movement allowed to the animal makes this trap exceptionally humane and also prevents the animal from pulling out its foot or twisting it off. As previously indicated, also, the tensioning arms 2, may be made of comparatively short length, since the snare is tightened by the combined swinging movements of the tensioning arms away from each other, and this enables the trap to be used in burrows and other confined places where the ordinary snare trap cannot be used.

While I prefer to employ the double loop snare herein shown and described, I wish it to be understood that other features of my improved trap will successfully cooperate with other forms of snare connected to and between the oppositely swinging tension arms, and I do not wish to be limited to the particular form of snare herein shown, described and claimed.

What I claim and desire to secure by Letters Patent is:

1. A snare trap comprising a base plate provided with a pair of oppositely disposed tensioning arms connected to the base plate by pivots disposed transversely of the base plate and capable of being folded down into horizontal position upon the base plate, independent springs engaging said arms for moving them upward and away from each other, a snare comprising two looped snare members each connected with one of said arms, said loops having overlapping portions, forming a snare noose, said overlapping portions being connected on opposite sides of the snare noose by rings each loosely engaging a portion of each snare member, locking detents for said arms pivotally connected with said base plate and provided with setting arms, a pivotally mounted dog for engaging said setting arms, and a tripping pan disposed substantially centrally of said arms and constructed to engage said dog.

2. A snare trap comprising a base plate provided with a pair of oppositely disposed tensioning arms connected to the base plate by pivots disposed transversely of the base plate and capable of being folded down into horizontal position upon the base plate, independent springs engaging said arms for moving them upward and away from each other, a snare connected to and between said arms, and forming a snare noose in set position, locking detents for said arms pivotally connected with the said base plate and provided with setting arms, a pivotally mounted dog for engaging said setting arms, and a tripping pan disposed substantially centrally of said arms and constructed to engage said dog, and an annular vertically movable snare holder surrounding the pan and supported by the outer end portions of said arms in the set position of the trap and provided with a channel for holding the snare noose.

3. A snare trap comprising a base plate provided with a pair of oppositely disposed tensioning arms connected to the base plate by pivots disposed transversely of the base plate and capable of being folded down into horizontal position upon the base plate, independent springs engaging said arms for moving them upward and away from each other, a snare comprising two looped snare members each connected with one of said arms, said loops having overlapping portions, forming a snare noose, said overlapping portions being connected on opposite sides of the snare noose, means loosely engaging a portion of each snare member and permitting relative longitudinal movement thereof, locking means for engaging said arms when in horizontal position, and releasing means for said locking means actuated by the foot of an animal, and an annular vertically and bodily movable snare holder for surrounding said releasing means and supported in the path of said arms in the set position of the trap, and provided with a channel to receive the snare noose, and adapted to be thrown upward by said arms when the trap is sprung.

4. A snare trap comprising a base plate provided with a pair of oppositely disposed tensioning arms connected to the base plate by pivots disposed transversely of the base plate and capable of being folded down into horizontal position upon the base plate, independent springs engaging said arms for moving them upward and away from each other, a snare comprising two looped snare members each connected with one of said arms, said loops having overlapping portions forming a snare noose, said overlapping portions being connected on opposite sides of the snare noose, means loosely engaging a portion of each snare member and permitting relative longitudinal movement thereof, locking means for engaging said arms when in horizontal position, and releasing means for said locking means actuated by the foot of an animal, and an annular vertically and bodily movable snare holder for surrounding said releasing means in the set position of the trap and provided with supporting projections for engaging the said arms when in set position.

5. A snare trap comprising a base provided with a pair of oppositely disposed spring actuated tensioning arms pivotally connected with the base and capable of being folded into horizontal position when the trap is set, a snare noose having portions connected with said arms, locking means for engaging said arms when in horizontal position, including a tripping pan, and means for supporting the snare noose in open position above and entirely free from said locking means, and enabling said snare to maintain a horizontal position when raised around the leg of an animal by said tension arms on the release of the locking means therefor.

6. A snare trap comprising a base provided with a pair of oppositely disposed spring actuated tensioning arms pivotally connected with the base and capable of being folded into horizontal position when the trap is set, a snare noose having portions connected with said arms, locking means for engaging said arms when in horizontal position, including a tripping pan, an annular snare holder unconnected with the base, and freely supported in horizontal position above the said arms and the locking means therefor, and capable of vertical movement bodily around the leg of the animal while maintaining its horizontal position when raised by said tension arms on the release of the locking means therefor.

7. A snare trap comprising a base provided with a pair of oppositely disposed spring actuated tensioning arms pivotally connected with the base and capable of being folded into horizontal position when the trap is set, a snare noose having portions connected with said arms, locking means for engaging said arms when in horizontal position, including a tripping pan, an annular snare holder unconnected with the base and freely supported in horizontal position above and upon said arms and above the locking means therefor, and capable of vertical movement bodily around the leg of an animal, while maintaining its horizontal position when raised by said arms on the release of the locking means therefor, said snare noose being constructed to arrest said tension arms in substantially vertical position.

8. A snare trap comprising a snare noose, tensioning means for raising said noose and simultaneously tightening it high up around the leg of an animal, locking and releasing means for said tensioning means, and a snare holder capable of vertical bodily movement around and with respect to the leg of the animal while maintaining a horizontal position, and freely supported above and independently of said locking and releasing means, and in position to be elevated by said tensioning means with the snare noose when the trap is sprung.

9. A snare trap comprising a base, a pair of oppositely disposed tensioning arms pivotally connected with the base, a snare noose having portions connected with said arms, locking means connected with said base for directly engaging said arms, including a tripping pan to be engaged by the foot of an animal to release said locking means, and an annular snare holder entirely unconnected with any other portion of the trap, freely supported upon said tensioning arms and above said locking means in the set position of the trap, for holding the snare noose in open position, said snare holder being capable of being moved vertically bodily by said arms together with the snare noose around and high up on the leg of an animal when the trap is sprung.

JOHN U. LEHN.